(12) United States Patent
Kato et al.

(10) Patent No.: US 10,840,628 B2
(45) Date of Patent: Nov. 17, 2020

(54) CONNECTOR

(71) Applicant: Yazaki Corporation, Tokyo (JP)

(72) Inventors: Hajime Kato, Shizuoka (JP); Fuminori Sugiyama, Shizuoka (JP); Yoshinori Hagita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/440,709

(22) Filed: Jun. 13, 2019

(65) Prior Publication Data

US 2019/0386417 A1  Dec. 19, 2019

(30) Foreign Application Priority Data

Jun. 14, 2018 (JP) ................................. 2018-113699

(51) Int. Cl.
*H01R 13/187* (2006.01)
*H01R 4/48* (2006.01)
*H01R 13/20* (2006.01)
*H01R 13/24* (2006.01)
*H01R 13/42* (2006.01)

(52) U.S. Cl.
CPC ............ *H01R 13/187* (2013.01); *H01R 4/48* (2013.01); *H01R 13/20* (2013.01); *H01R 13/24* (2013.01); *H01R 13/42* (2013.01)

(58) Field of Classification Search
CPC ...... H01R 4/4863; H01R 4/48; H01R 13/187; H01R 13/20; H01R 13/24; H01R 13/42

USPC ......................................... 439/816, 817, 840
See application file for complete search history.

(56) References Cited

U.S. PATENT DOCUMENTS 3,513,434 A * 5/1970 Zielke ...................... H01R 9/28
439/709
4,462,657 A * 7/1984 Snowdon ............. H01R 13/187
439/724
4,514,025 A * 4/1985 Maulandi ............... H02B 11/04
439/246
4,810,213 A * 3/1989 Chabot ................. H01R 13/17
439/825

(Continued)

FOREIGN PATENT DOCUMENTS

CN          103187644 A     7/2013
EP          2 469 659 A2    6/2012

(Continued)

*Primary Examiner* — Gary F Paumen
(74) *Attorney, Agent, or Firm* — Kenealy Vaidya LLP

(57) ABSTRACT

A connector which can improve reliability of electrical connection is provided. Accommodation recesses are formed to a plate-like terminal member, and a coil member accommodated in the accommodation recesses is retained to the terminal member, thereby allowing wire winding portions of the coil member to be deformed within the accommodation recesses when the winding wire portions are sandwiched between bottom faces of the accommodation recesses and a mating terminal. Consequently, the obliquely wound coil member is not likely to experience deformation other than fall over of ring portions, and/or is not likely to be displaced, improving contact between the coil member and both of the terminal member and the mating terminal. As a result, reliability of electrical connection can be improved.

6 Claims, 7 Drawing Sheets

(56) References Cited

U.S. PATENT DOCUMENTS

| | | | | | |
|---|---|---|---|---|---|
| 4,969,824 | A | * | 11/1990 | Casciotti | ................ H01R 12/62 |
| | | | | | 439/62 |
| 5,061,191 | A | * | 10/1991 | Casciotti | ............ H01L 23/4006 |
| | | | | | 257/E23.084 |
| 6,666,690 | B2 | * | 12/2003 | Ishizuka | ............ H01R 13/2421 |
| | | | | | 439/591 |
| 2019/0245293 | A1 | * | 8/2019 | Kimura | .................. H01R 13/24 |

FOREIGN PATENT DOCUMENTS

| | | |
|---|---|---|
| JP | 2010-238466 A | 10/2010 |
| JP | 2016-46156 A | 4/2016 |
| JP | 2017-112031 A | 6/2017 |
| WO | 2018/008384 A1 | 1/2018 |

\* cited by examiner

CONNECTOR

TECHNICAL FIELD

The present invention relates to a connector having an obliquely wound coil member and configured to elastically contact with a mating terminal.

BACKGROUND

Conventionally, a connector has been proposed that electrically connects a terminal fitting of a first connector and a terminal fitting of a second connector via a coil spring sandwiched between the terminal fittings (for example, refer to Patent Document 1 listed below). In a connector described in Patent Document 1, an obliquely wound coil spring disposed on a first terminal fitting is configured to be deformed so as to further fall over when pushed by a second terminal fitting.

PRIOR ART DOCUMENT

Patent Document

Patent Document 1: JP 2017-112031 A

SUMMARY OF THE INVENTION

Problem to be Solved

However, in the connector described in Patent Document 1, although the obliquely wound coil spring tends to fall over in a predetermined direction while being deformed, there is a possibility that the coil spring may experience deformation other than fall over and/or may be displaced. That is, when unpredicted deformation and such occurs that could lead to a decrease in reliability of electrical connection.

In view of the above-described problem, an object of the present invention is to provide a connector which can improve reliability of electrical connection.

Solution to Problem

In order to achieve the above-described object, the present invention provides a connector configured to elastically contact with a mating terminal, including, an obliquely wound coil member, a terminal member which is formed into a plate-like shape and on which the coil member is arranged, and a retainer retaining the coil member, wherein, the terminal member includes an accommodation face on which an accommodation recess for accommodating the coil member is formed, and the retainer retains the coil member accommodated in the accommodation recess.

Advantageous Effect of the Invention

According to the connector of the present invention, the accommodation recess is formed on the plate-like terminal member, and the coil member accommodated in the accommodation recess is retained to the terminal member, thereby allowing the coil member to be deformed within the accommodation recess when the coil member is sandwiched between a bottom face of the accommodation recess and a terminal fitting of the mating connector. Consequently, the obliquely wound coil member is not likely to experience deformation other than fall over and/or is not likely to be displaced, improving the contact between the coil member and both of the terminal member and the terminal fitting of the mating connector. As a result, reliability of electrical connection can be improved.

DETAILED DESCRIPTION OF THE EXEMPLARY EMBODIMENTS

In the following, various embodiments of the present invention will be described with reference to the drawings. With respect to a second embodiment and a third embodiment, elements that are the same as or having similar function as those described in a first embodiment are denoted by the same reference signs with the first embodiment, and explanation thereof is omitted.

First Embodiment

Figure 1:
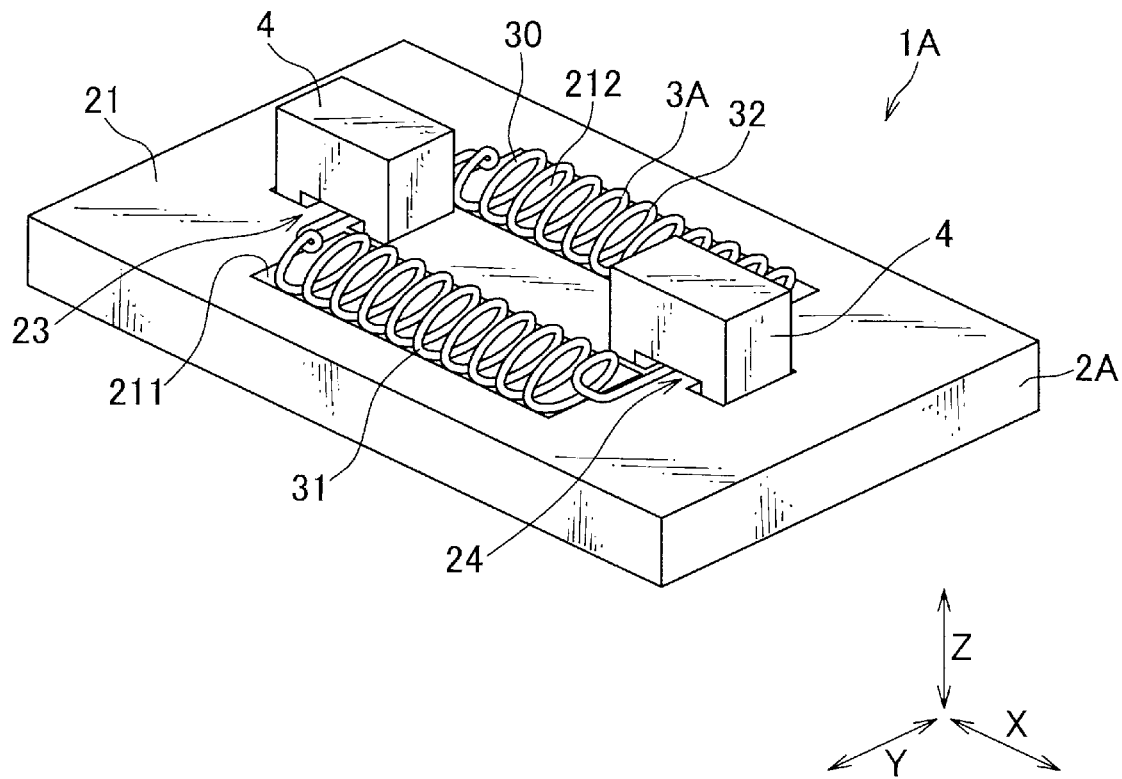
FIG. 1 is a perspective view of a connector according to a first embodiment of the present invention.
Figure 2:
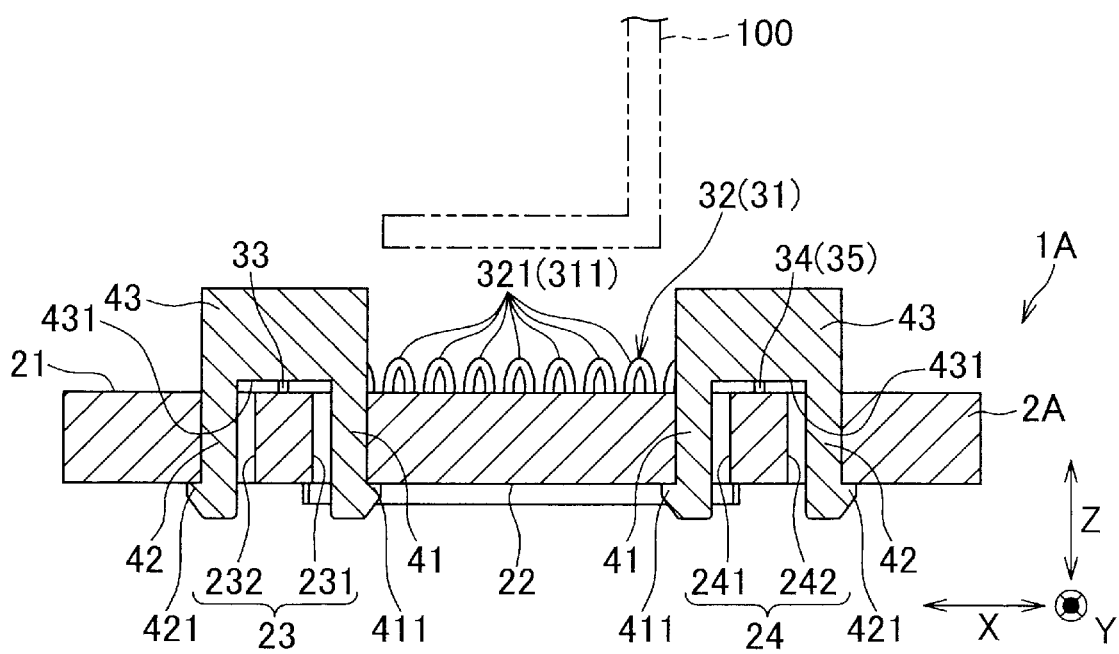
FIG. 2 is a cross-sectional view of the connector.

As shown in FIGS. 1 and 2, a connector 1A of this embodiment includes a terminal member 2A, a coil member 3A, two fixation pins 4 as a retainer, and a connector housing. The connector 1A and a mating connector are respectively provided on tips of wire harnesses, for example, and are connected to each other by fitting together their connector housings, by which the terminal member 2A and a mating terminal 100 are electrically connected.

The terminal member 2A is made of an electrically conductive metal member and formed into a rectangular plate-like shape in a plan view, and is electrically connected to a conductor (i.e., a core wire) of a wire harness, for example. In the following, a plate thickness direction of the terminal member 2A corresponds to a Z direction, and a long-side direction and a short-side direction of the rectangular shape of the terminal member 2A correspond to an X direction and a Y direction, respectively. Two accommodation recesses 211, 212 are formed on an accommodation face 21 corresponding to one face of the terminal member 2A. Further, two pairs of through holes 23, 24 that extend in the Z direction (i.e., extending from the accommodation face 21 to a face 22 on an opposite side) are formed on the terminal member 2A.

Each of the accommodation recesses 211, 212 is extending in the X direction. Size in the X direction of the accommodation recess is substantially equal to or slightly larger than an equilibrium length of the coil member 3A, and size in the Y direction of the accommodation recess is substantially equal to or slightly larger than a diameter of the coil member 3A. Depth of the accommodation recess is substantially equal to a radius of the coil member 3A. The two accommodation recesses 211, 212 are arranged side by side in the Y direction.

Figure 3:
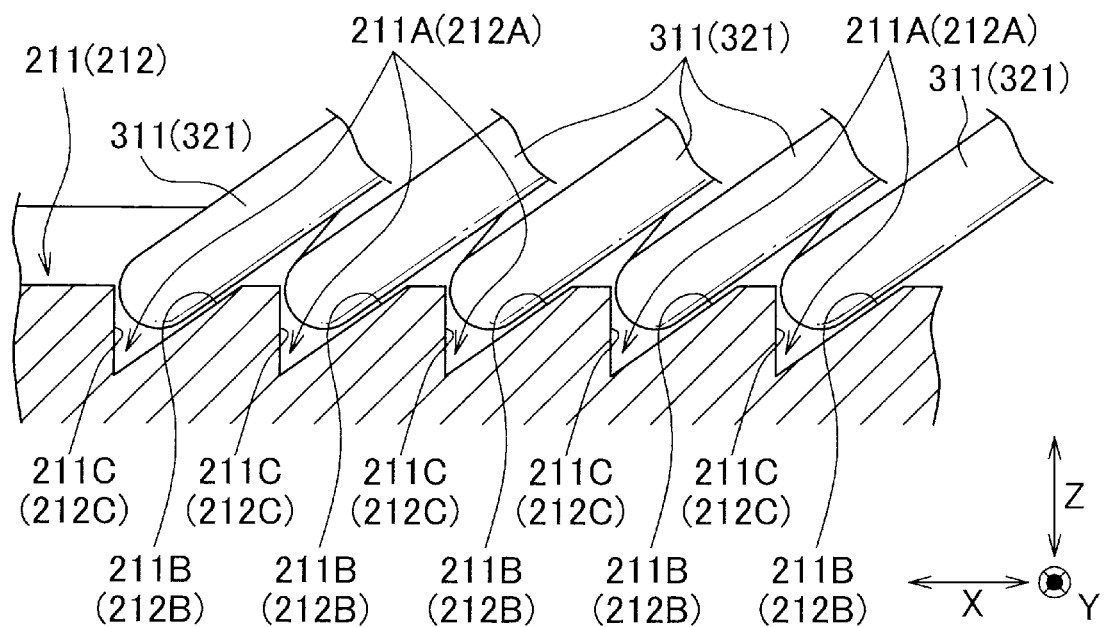
FIG. 3 is a cross-sectional view of a portion of the connector.

As shown in FIG. 3, bottom faces of the accommodation recesses 211, 212 are provided with a plurality of concaved arrangement portions 211A, 212A in which a later-described plurality of ring portions 311, 321 of the coil member 3A is arranged respectively. The arrangement portion 211A, 212A includes an inclined face 211B, 212B inclined with respect to the X direction, and a vertical face 211C, 212C extending in the Z direction. That is, the plurality of inclined faces 211B, 212B which is inclined with respect to the accommodation face 21 and to which each of the plurality of ring portions 311, 321 is arranged, is formed on the bottom faces of the accommodation recesses 211, 212.

Figure 4:
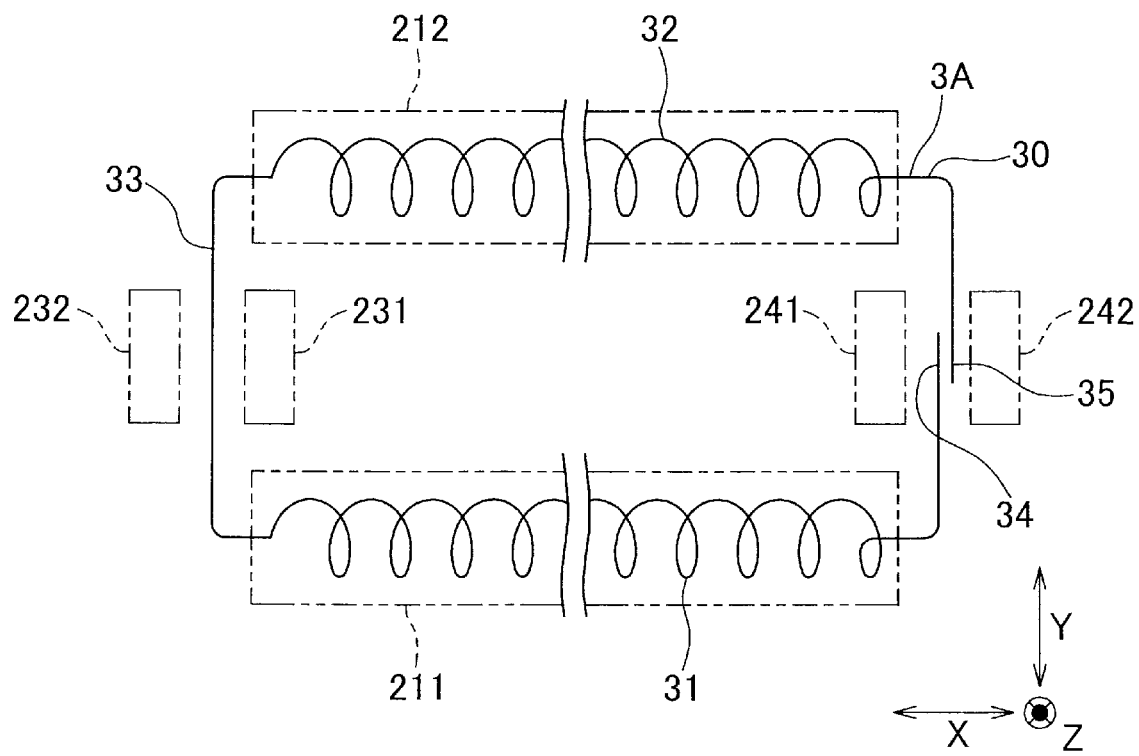
FIG. 4 is a plan view schematically showing a coil member of the connector.

As shown in FIG. 4, the pairs of through holes 23, 24 are formed in a region between the two accommodation recesses 211, 212 in the Y direction. One pair of through holes 23 is arranged on one end side in the X direction of the accommodation recesses 211, 212, and another pair of through holes 24 is arranged on another end side in the X direction of the accommodation recesses 211, 212. The one pair of through holes 23 is constituted of an inner through hole 231 formed at a location sandwiched between the two accommodation recesses 211, 212, and an outer through hole 232 formed at a location not sandwiched between the two accommodation recesses 211, 212. Similarly, the another pair of through holes 24 is constituted of an inner through hole 241 formed at a location sandwiched between the two accommodation recesses 211, 212, and an outer through hole 242 formed at a location not sandwiched between the two accommodation recesses 211, 212.

The coil member 3A is constituted of a single wire 30 made of metal, and includes two winding wire portions 31, 32 that are obliquely wound. The winding wire portions 31, 32 are formed in a spiral fashion, and thus have the plurality of ring portions 311, 321 (one turn corresponds to one ring portion). The two winding wire portions 31, 32 are accommodated in the accommodation recesses 211, 212, respectively, thereby extending with their axial direction corresponding to the X direction and being arranged side by side in the Y direction. The two winding wire portions 31, 32 are connected to each other at one end side in the X direction by a connecting portion 33 extending in the Y direction, and have ends 34, 35 arranged at another end side in the X direction. The ends 34, 35 are arranged side by side in the X direction, for example. The connecting portion 33 is arranged between the inner through hole 231 and the outer through hole 232 of the one pair of through holes 23, and the ends 34, 35 are arranged between the inner through hole 241 and the outer through hole 242 of the another pair of through holes 24.

Expression of "obliquely wound" used herein means that the ring portions 311, 321 have an inclination angle with respect to the Z direction that is equal to or greater than a predetermined angle such that the ring portions 311, 321 upon applied with a force in the Z direction will fall over in a predetermined direction. Further, the orientation of the inclination of the ring portions 311, 321 coincides with the orientation of the inclination of the inclined faces 211B, 212B at the bottom faces of the accommodation recesses 211, 212. Further, although in this embodiment the inclination orientations of the two wire winding portions 31, 32 are arranged coincide with each other, they may be arranged opposite to each other.

The fixation pins 4 are formed separately from the terminal member 2A and are used to allow the terminal member 2A to retain the coil member 3A. The fixation pin 4 may be formed of an electrically conductive member, or may be formed of an insulating member. The fixation pin 4 includes a pair of latch legs 41, 42 and a coupling portion 43 coupling the latch legs 41, 42.

One latch legs 41 are configured to be inserted through the inner through holes 231, 241 of the terminal member 2A, and the other latch legs 42 are configured to be inserted through the outer through holes 232, 242. The latch legs 41, 42 include latch projections 411, 421 provided to tips of the latch legs 41, 42 and projecting away from each other. The pairs of latch legs 41, 42 are inserted through the through holes 231, 232, 241, 242 from the accommodation face 21 side, and during the latch projections 411, 421 passing through the through holes 231, 232, 241, 242, the latch legs 41, 42 are bent and deformed so as to approach each other. Once the latch projections 411, 421 have passed through the through holes 231, 232, 241, 242 and reached to the face 22 on the opposite side, the latch legs 41, 42 restore to their original shape. In such manner, the latch legs 41, 42 are latched to the face 22 on the opposite side of the accommodation face 21 by the latch projections 411, 421.

With the latch legs 41, 42 being latched to the face 22 on the opposite side, the coupling portion 43 extends in the X direction, and a lower face 431 of the coupling portion 43 is arranged with a space from the accommodation face 21. The space between the lower face 431 and the accommodation face 21 is substantially the same as or slightly smaller than the diameter of the wire 30 constituting the coil member 3A, allowing the lower face 431 and the accommodation face 21 to sandwich the connecting portion 33 or the ends 34, 35. That is, the coupling portion 43 serves as a coil sandwiching portion sandwiching a portion of the coil member 3A between the coupling portion 43 and the accommodation face 21.

By attaching the fixation pins 4 to the terminal member 2A in a manner as described above, the coil member 3A is sandwiched between the fixation pins 4 and the terminal member 2A and retained, thereby positioning the winding wire portions 31, 32 in the accommodation recesses 211, 212. That is, the fixation pin 4 retains the coil member 3A accommodated in the accommodation recesses 211, 212, and thus serves as a retainer.

The connector housing is made of insulating resin and formed into a box-like shape, for example, and accommodates the terminal member 2A, the coil member 3A and the fixation pins 4. The connector housing includes an opening on the accommodation face 21 side through which the mating terminal 100 can pass. It is noted that the mating terminal 100 should have size and shape that do not interfere with the fixation pins 4.

When connecting the above-described connector 1 and the mating connector, the mating terminal 100 is brought close to the terminal member 2A, and after the mating terminal 100 has contacted the winding wire portions 31, 32 of the coil member 3A, the mating terminal 100 compresses the winding wire portions 31, 32 so as to push them against the terminal member 2A. At this time, the winding wire portions 31, 32 are deformed such that the ring portions 311, 321 fall over in accordance with the orientation of the oblique windings. In this manner, the connector 1 elastically contacts with the mating terminal 100 via the coil member 3A, and the terminal member 2A and the mating terminal 100 are electrically connected to each other via the coil member 3A.

This embodiment as described above provides the following advantageous effects. That is, by forming the accommodation recesses 211, 212 to the plate-like terminal member 2A and retaining the coil member 3A accommodated in the accommodation recesses 211, 212, to the terminal member 2A, the winding wire portions 31, 32 of the coil member 3A can be deformed within the accommodation recesses 211, 212 when the winding wire portions 31, are being sandwiched between the bottom faces of the accommodation recesses 211, 212 and the mating terminal 100. Consequently, the obliquely wound coil member 3A is not likely to experience deformation other than the fall over of the ring portions 311, 321 and/or is not likely to be displaced, improving contact between the coil member 3A and both of the terminal member 2A and the mating terminal 100, thereby improving reliability of electrical connection. In addition, positioning of the coil member 3A can be facilitated by the accommodation recesses 211, 212.

Further, since the fixation pins 4 having the latch legs 41, 42 and the coupling portion 43 as a coil sandwiching portion, is used as fixation means to retain the coil member 3A to the terminal member 2A, it is possible to easily keep the winding wire portions 31, 32 of the coil member 3A accommodated within the accommodation recesses 211, 212.

Further, since the inclined faces 211B, 212B are formed on the bottom face of the accommodation recesses 211, 212, it is possible to easily make the winding wire portions 31, 32 to fall over in accordance with the orientation of the oblique winding. Consequently, a force required to deform the coil member 3A can be minimized, thereby improving workability for connecting the connectors to each other.

Further, since the coil member 3A includes the two winding wire portions 31, 32 that are respectively extending in the X direction and are arranged side by side in the Y direction, a contact face of the mating terminal 100 contacting the winding wire portions 31, 32 can be maintained substantially parallel with respect to the accommodation face 21.

Second Embodiment

Figure 5:
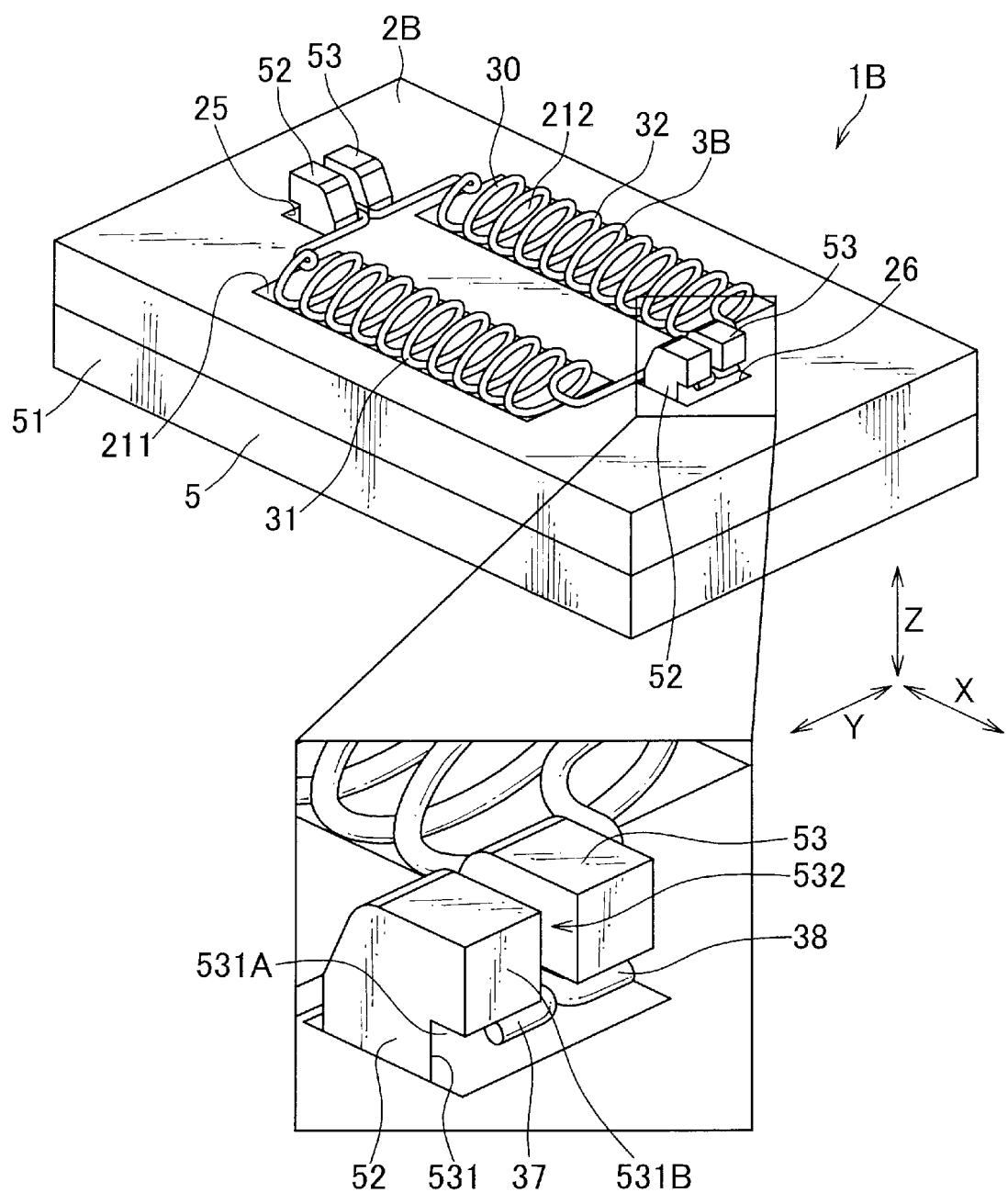
FIG. 5 is a perspective view of a connector according to a second embodiment of the present invention.
Figure 6:
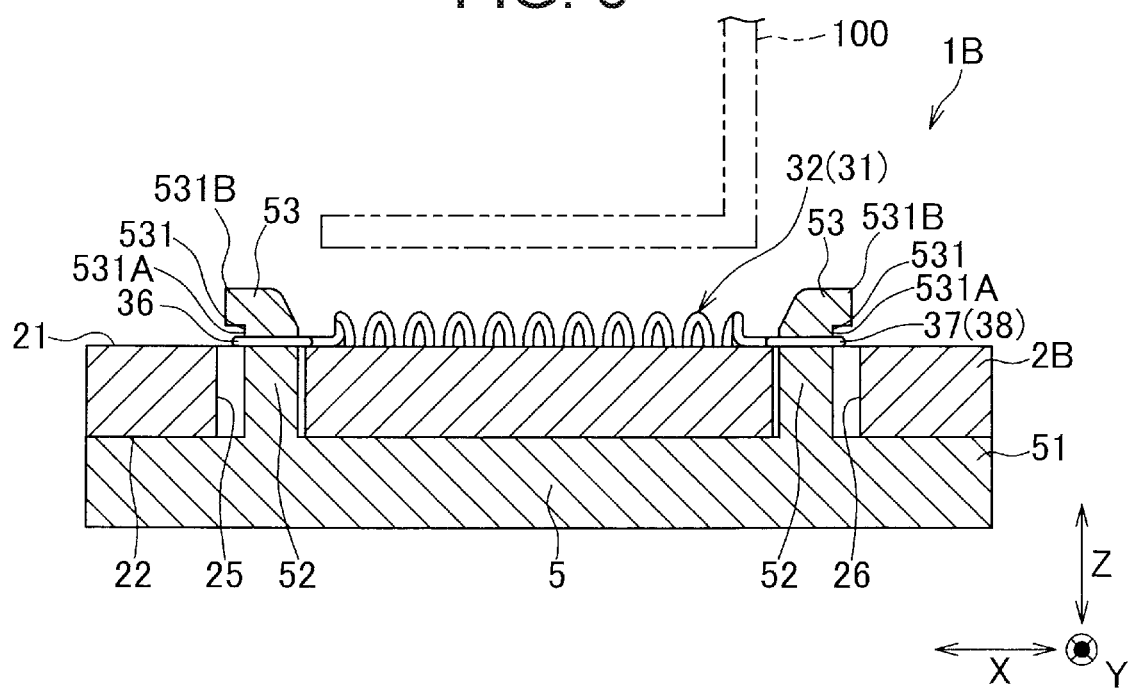
FIG. 6 is a cross-sectional view of the connector.

As shown in FIGS. 5 and 6, a connector 1B of this embodiment includes a terminal member 2B, a coil member 3B, a latch member 5 as a retainer, and a connector housing.

As with the case of the terminal member 2A of the first embodiment, the terminal member 2B is made of an electrically conductive metal member and formed into a rectangular plate-like shape in a plan view, and includes two accommodation recesses 211, 212 formed on an accommodation face 21. The terminal member 2B includes two through holes 25, 26 extending in the Z direction (i.e., extending from the accommodation face 21 to a face 22 on an opposite side). The through holes 25, 26 are formed in a region between the two accommodation recesses 211, 212 in the Y direction, and positioned so as not to be sandwiched between the two accommodation recesses 211, 212 in the X direction.

As with the case of the coil member 3A of the first embodiment, the coil member 3B is constituted of a single wire 30 made of metal, and includes two winding wire portions 31, 32 that are obliquely wound. The two winding wire portions 31, 32 are connected to each other at one end side in the X direction by a connecting portion 36, and have ends 37, 38 arranged at another end side in the X direction.

The latch member 5 is formed separately from the terminal member 2B, and integrally includes a plate portion 51 configured to be placed on the opposite face 22 of the terminal member 2B, two projections 52 projecting from the plate portion 51 towards the terminal member 2B, and hook portions 53 formed on tips of the projections 52. The latch member 5 may be constituted of an electrically conductive member, or may be constituted of an insulating member. The latch member 5 is fixed to the terminal member 2B using an adhesive agent, a fixation clamp or the like.

The two projections 52 are inserted through the two through holes 25, 26 of the terminal member 2B, respectively. In this manner, the hook portions 53 project from the accommodation face 21. The hook portion 53 includes coil latch portion 531 heading to an opposite side with respect to the accommodation recesses 211, 212 in the X direction, and configured to engage with the connecting portion 36 or the ends 37, 38 of the coil member 3B. The coil latch portion 531 is constituted of an abutting face 531A on which the connecting portion 36 or the ends 37, 38 abut, and a protrusion 531B located on a tip side with respect to the abutting face 531A (i.e., located on the side distant from the accommodation face 21) and projecting toward an opposite side with respect to the accommodation recesses 211, 212 in the X direction.

When viewed in the X direction, the hook portion 53 has a bifurcated shape, thereby forming a coil passage portion 532 between the bifurcation through which the wire 30 of the coil member 3B can pass. That is, the connecting portion 36 or the ends 37, 38 of the coil member 3B can be passed through the coil passage portion 532 from the accommodation recess 211, 212 side toward the coil latch portion 531.

Figure 7:
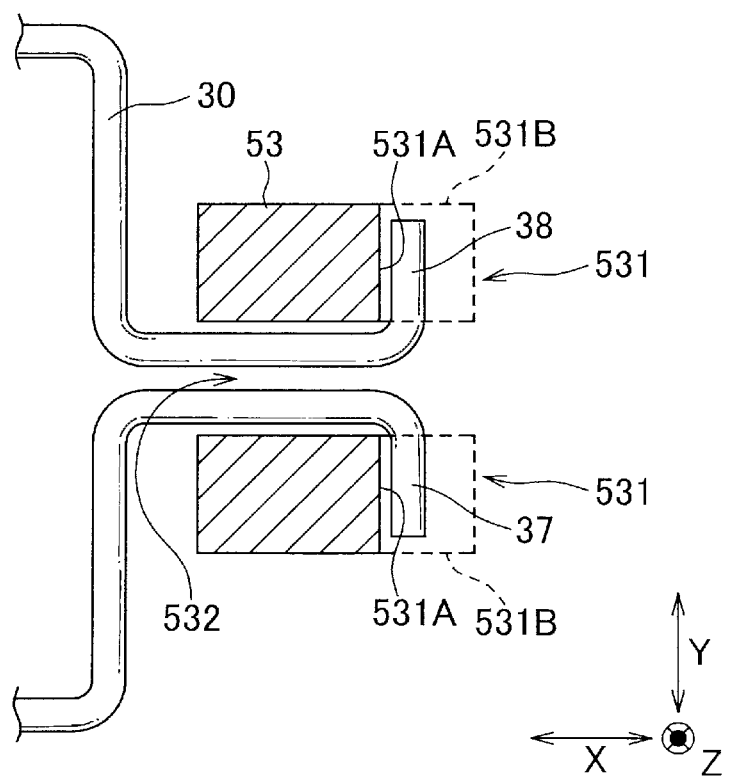
FIG. 7 is a plan view illustrating how a hook portion of the connector engages with an end of a coil member.
Figure 8:
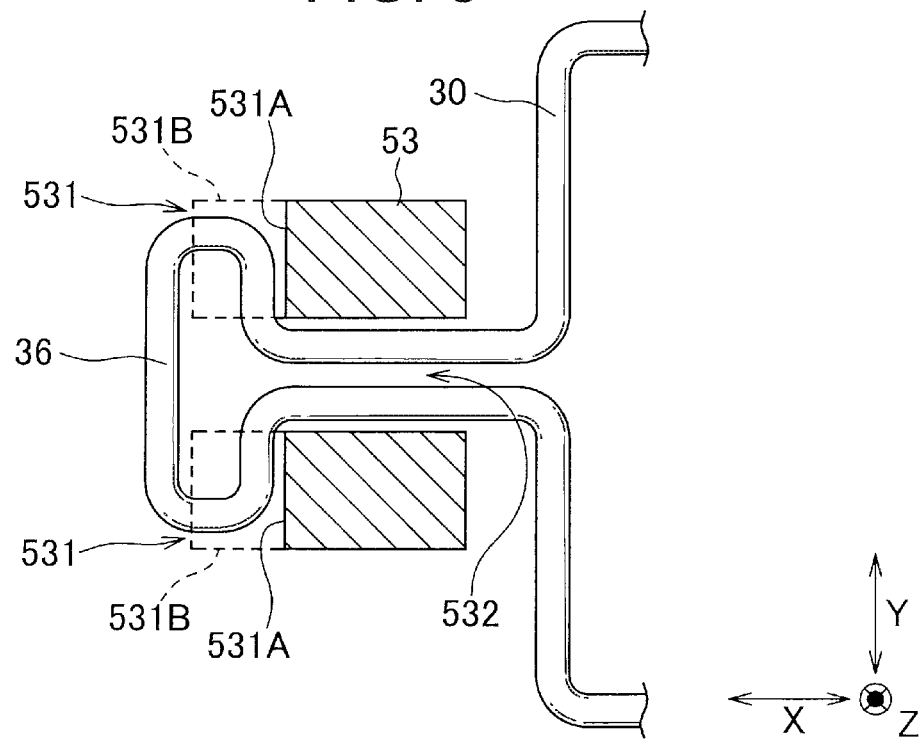
FIG. 8 is a plan view illustrating how a hook portion of the connector engages with a connecting portion of the coil member.

Referring now to FIGS. 7 and 8, a detailed structure for engaging with the connecting portion 36 or the ends 37, 38 of the coil member 3B by the hook portion 53 is explained below. The ends 37, 38 sides of the wire 30 extend from the winding wire portions 31, 32 toward each other in the Y direction, and then extend in the X direction away from the accommodation recesses 211, 212 and pass through the coil passage portion 532. After passing through the coil passage portion 532, the ends 37, 38 sides of the wire 30 extend in the Y direction away from each other, and then the ends 37, 38 are latched by the coil latch portion 531.

The connecting portion 36 sides of the wire 30 extend from the winding wire portions 31, 32 toward each other in the Y direction, and then extend in the X direction away from the accommodation recesses 211, 212 and pass through the coil passage portion 532. After passing through the coil passage portion 532, the connecting portion 36 sides of the wire 30 extend in the Y direction away from each other, but soon extend toward each other again and connected to each other, thereby forming the annular connecting portion 36. The annular connecting portion 36 is engaged with the coil latch portion 531. In such manner, the latch member 5 fixed to the terminal member 2B engages with the connecting portion 36 and the ends 37, 38 of the coil member 3B via the hook portions 53, thereby positioning the winding wire portions 31, 32 within the accommodation recesses 211, 212. That is, the latch member 5 retains the coil member 3B accommodated in the accommodation recesses 211, 212, and thus serves as a retainer.

This embodiment as described above provides the following advantageous effects. That is, as with the case of the first embodiment, by forming the accommodation recesses 211, 212 to the plate-like terminal member 2B and retaining the coil member 3B accommodated in the accommodation recesses 211, 212, to the terminal member 2B, the contact between the obliquely wound coil member 3B and both of the terminal member 2B and the mating terminal 100 can be improved, thereby improving reliability of electrical connection. In addition, positioning of the coil member 3B can be facilitated by the accommodation recesses 211, 212.

Further, by retaining the coil member 3B to the terminal member 2B using the latch member 5 having the hook portions 53 as a retainer, it is possible to easily keep the winding wire portions 31, 32 of the coil member 3B accommodated within the accommodation recesses 211, 212.

Further, since the hook portion 53 includes the coil passage portion 532, a portion of the wire 30 of the coil member 3B that is passed through the coil passage portion 532 can be prevented from being deformed, thereby preventing release of engagement between the wire 30 and the hook portion 53.

Further, since the coil member 3B includes the two winding wire portions 31, 32 that are respectively extending in the X direction and are arranged side by side in the Y direction, a contact face of the mating terminal 100 contacting the winding wire portions 31, 32 can be maintained substantially parallel with respect to the accommodation face 21.

Third Embodiment

Figure 9:
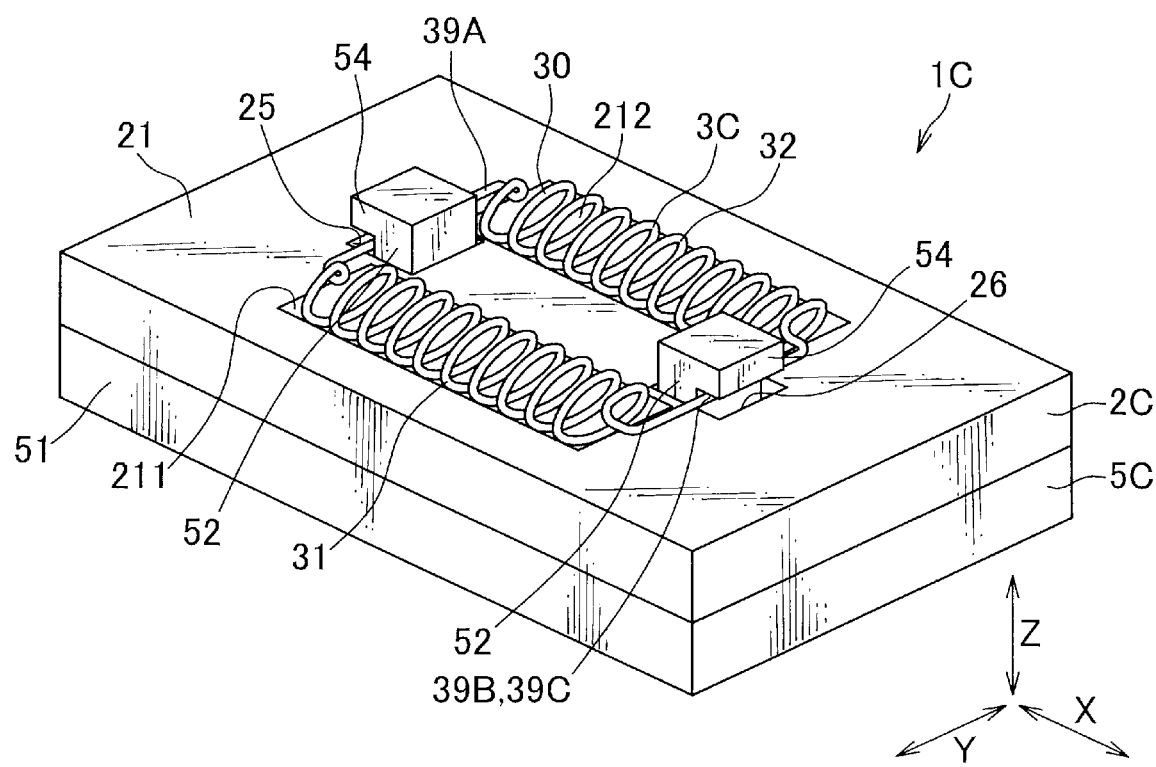
FIG. 9 is a perspective view of a connector according to a third embodiment of the present invention.
Figure 10:
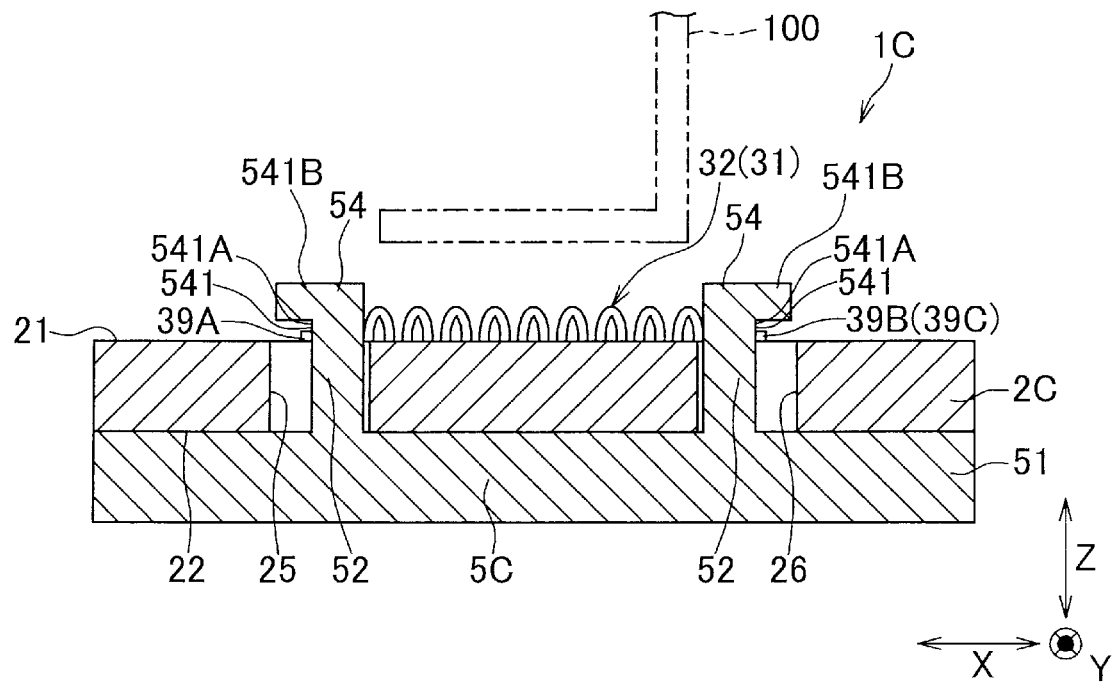
FIG. 10 is a cross-sectional view of the connector.

As shown in FIGS. 9 and 10, a connector 1C of this embodiment includes a terminal member 2C, a coil member 3C, a latch member 5C as a retainer, and a connector housing.

As with the case of the terminal member 2A of the first embodiment, the terminal member 2C is made of an electrically conductive metal member and formed into a rectangular plate-like shape in a plan view, and includes two accommodation recesses 211, 212 formed on an accommodation face 21. The terminal member 2C includes two through holes 25, 26 extending in the Z direction (i.e., extending from the accommodation face 21 to a face 22 on an opposite side).

As with the case of the coil member 3A of the first embodiment, the coil member 3C is constituted of a single wire 30 made of metal, and includes two winding wire portions 31, 32 that are obliquely wound. The two winding wire portions 31, 32 are connected to each other at one end side in the X direction by a connecting portion 39A, and have ends 39B, 39C arranged at another end side in the X direction.

The latch member 5C is formed separately from the terminal member 2C, and integrally includes a plate portion 51 configured to be placed on the opposite face 22 of the terminal member 2C, two projections 52 projecting from the plate portion 51 towards the terminal member 2C, and hook portions 54 formed on tips of the projections 52. The latch member 5C may be constituted of an electrically conductive member, or may be constituted of an insulating member. The latch member 5C is fixed to the terminal member 2C using an adhesive agent, a fixation clamp or the like.

The two projections 52 are inserted through the two through holes 25, 26 of the terminal member 2C, respectively. In this manner, the hook portions 54 project from the accommodation face 21. The hook portion 54 includes coil latch portion 541 heading to an opposite side with respect to the accommodation recesses 211, 212 in the X direction, and configured to engage with the connecting portion 39 or the ends 39B, 39C of the coil member 3C. The coil latch portion 541 is constituted of an abutting face 541A on which the connecting portion 39 or the ends 39B, 39C abut, and a protrusion 541B located on a tip side with respect to the abutting face 541A (i.e., located on the side distant from the accommodation face 21) and projecting toward an opposite side with respect to the accommodation recesses 211, 212 in the X direction.

Figure 11:
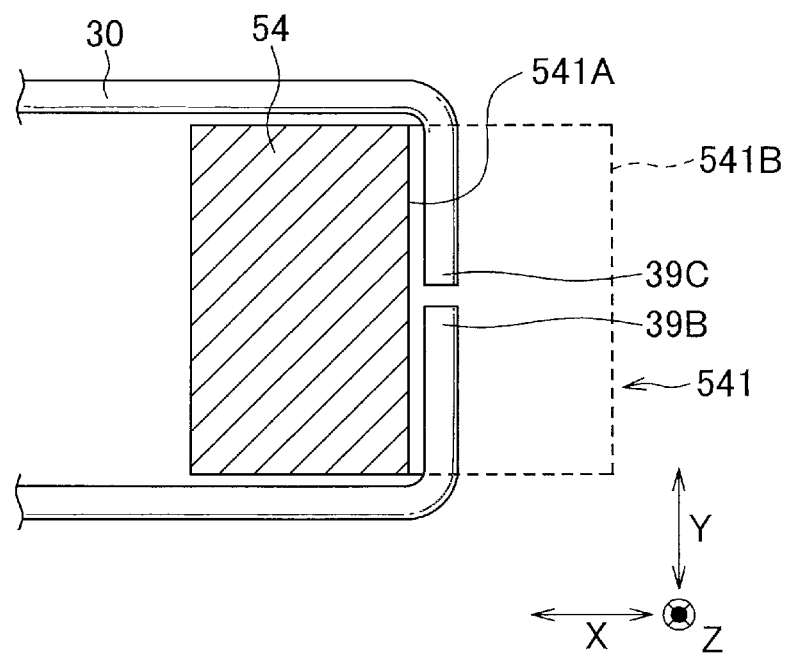
FIG. 11 is a plan view illustrating how a hook portion of the connector engages with an end of a coil member.
Figure 12:
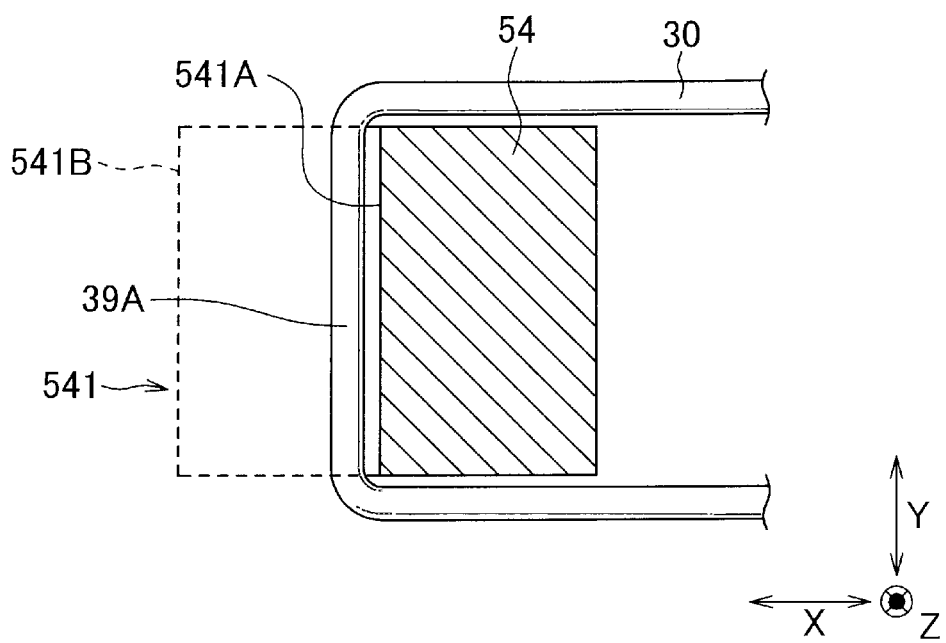
FIG. 12 is a plan view illustrating how a hook portion of the connector engages with a connecting portion of the coil member.

Unlike the hook portion 53 of the second embodiment, the hook portion 54 does not include the coil passage portion. That is, as shown in FIGS. 11 and 12, the wire 30 of the coil member 3C is hooked around an outer side of the hook portion 54, thereby engaging with the connecting portion 39A or the ends 39B, 39C. Thus, the latch member 5C fixed to the terminal member 2C engages with the connecting portion 39A or the ends 39B, 39C of the coil member 3C via the hook portion 54, thereby positioning the winding wire portions 31, 32 within the accommodation recesses 211, 212. That is, the latch member 5C retains the coil member 3C accommodated in the accommodation recesses 211, 212, and thus serves as a retainer.

This embodiment as described above provides the following advantageous effects. That is, as with the case of the first embodiment, by forming the accommodation recesses 211, 212 to the plate-like terminal member 2C and retaining the coil member 3C accommodated in the accommodation recesses 211, 212, to the terminal member 2C, the contact between the obliquely wound coil member 3C and both of the terminal member 2C and the mating terminal 100 can be improved, thereby improving reliability of electrical connection. In addition, positioning of the coil member 3C can be facilitated by the accommodation recesses 211, 212.

Further, by retaining the coil member 3C to the terminal member 2C using the latch member 5C having the hook portions 54 as a retainer, it is possible to easily keep the winding wire portions 31, 32 of the coil member 3C accommodated within the accommodation recesses 211, 212.

Further, since the coil member 3C includes the two winding wire portions 31, 32 that are respectively extending in the X direction and are arranged side by side in the Y direction, a contact face of the mating terminal 100 contacting the winding wire portions 31, 32 can be maintained substantially parallel with respect to the accommodation face 21.

The present invention should not be limited to the embodiments described above, and other configurations and such that can achieve the object of the present invention are within the present invention. For example, the following modifications are within the present invention.

For example, in the first to third embodiments, the coil member 3A to 3C includes two winding wire portions 31, 32, however the present invention is not limited to this and the coil member may include only one winding wire portion, or may include three or more winding wire portions. In case where the coil member includes a plurality of winding wire portions, the plurality of winding wire portions may be formed of a single wire, or each of the winding wire portions may be formed of an independent wire. In addition, any number of the accommodation recesses may be formed on the accommodation face of the terminal member, as long as the number of the accommodation recesses is greater than the number of winding wire portions.

Further, in the first embodiment, the inclined faces 211B, 212B are formed to the bottom faces of the accommodation recesses 211, 212, however the present invention is not limited to this. The inclined faces may not be formed if, for example, the inclination angle of the obliquely wound winding wire portion is sufficiently large, and the ring portions are likely to fall over in a predetermined direction.

Further, in the second and third embodiments, the latch member 5, 5C having the hook portions 53, 54 is formed separately from the terminal member 2B, 2C. However, the hook portion may be formed integrally with the terminal member and may be formed to project from the accommodation face. Such configuration can reduce number of parts.

Preferred configurations, techniques and such for implementing the present invention have been disclosed. However, the present invention is not limited to these. That is, although the present invention has been specifically shown and described mainly with respect to specific embodiments, a person skilled in the art can make various modifications to those embodiments described above in terms of shape, material, number and/or other detailed configurations without departing from the scope of technical idea and an object of the present invention. Description that may limit the shape, material and such disclosed herein is used for the illustrative purpose only to enhance understanding of the present invention, and thus is not intended to limit the present invention. Therefore, description using name of a member without such limitation, either entire limitation or a part of limitation, regarding the shape, material and such, is also within the present invention.

LIST OF REFERENCE SIGNS 1A-1C connector
2A-2C terminal member
21 accommodation face
23, 24 pair of through holes
211, 212 accommodation recess
211B, 212B inclined face
3A-3C coil member
4 fixation pin (retainer)
41, 42 latch leg
43 coupling portion (coil sandwiching portion)
5, 5C latch member (retainer)
53, 54 hook portion
532 coil passage portion
100 mating terminal

What is claimed is:

1. A connector configured to elastically contact with a mating terminal, comprising:
an obliquely wound coil member;
a terminal member which is formed into a plate-like shape and on which the coil member is arranged; and
a retainer retaining the coil member, wherein
the terminal member includes an accommodation face on which an accommodation recess for accommodating the coil member is formed,
the retainer retains the coil member that is accommodated in the accommodation recess,
the terminal member includes through holes extending in a plate thickness direction, and
the retainer is formed separately from the terminal member, and includes a coil sandwiching portion configured to sandwich a portion of the coil member between the accommodation face and the coil sandwiching portion, and latch legs inserted through the through holes and engaged with an face on an opposite side of the accommodation face.

2. The connector according to claim 1, wherein
inclined faces inclined with respect to the accommodation face are formed on a bottom face of the accommodation recess.

3. A connector configured to elastically contact with a mating terminal, comprising:
an obliquely wound coil member;
a terminal member which is formed into a plate-like shape and on which the coil member is arranged; and
a retainer retaining the coil member, wherein
the terminal member includes an accommodation face on which an accommodation recess for accommodating the coil member is formed,
the retainer retains the coil member that is accommodated in the accommodation recess,
the retainer includes a hook portion projecting from the accommodation face, and
the hook portion includes a coil latch portion heading to an opposite side with respect to the accommodation recess and latching a portion of the coil member.

4. The connector according to claim 3, wherein
the hook portion includes a coil passage portion through which a portion of the coil member can pass from the accommodation recess side to the coil latch portion side.

5. The connector according to claim 3, wherein
inclined faces inclined with respect to the accommodation face are formed on a bottom face of the accommodation recess.

6. The connector according to claim 4, wherein
inclined faces inclined with respect to the accommodation face are formed on a bottom face of the accommodation recess.

* * * * *